(12) United States Patent
Engrand

(10) Patent No.: US 9,296,052 B2
(45) Date of Patent: Mar. 29, 2016

(54) METHOD FOR MACHINING A CASING OF AN AIRCRAFT TURBOSHAFT ENGINE AND SCRAPER TOOL FOR IMPLEMENTING SAID METHOD

(75) Inventor: Eric Dany Robert Jean Engrand, Villemoisson sur Orge (FR)

(73) Assignee: SNECMA, Paris (FR)

( * ) Notice: Subject to any disclaimer, the term of this patent is extended or adjusted under 35 U.S.C. 154(b) by 278 days.

(21) Appl. No.: 13/882,318

(22) PCT Filed: Oct. 28, 2011

(86) PCT No.: PCT/FR2011/052530
§ 371 (c)(1),
(2), (4) Date: Apr. 29, 2013

(87) PCT Pub. No.: WO2012/059670
PCT Pub. Date: May 10, 2012

(65) Prior Publication Data
US 2013/0216322 A1 Aug. 22, 2013

(30) Foreign Application Priority Data
Nov. 2, 2010 (FR) ...................................... 10 58983

(51) Int. Cl.
*B23C 3/00* (2006.01)
*B23B 29/14* (2006.01)
(Continued)

(52) U.S. Cl.
CPC ................ *B23C 3/007* (2013.01); *B23B 29/14* (2013.01); *B23B 31/083* (2013.01); *B23C 3/122* (2013.01);
(Continued)

(58) Field of Classification Search
CPC ............ B23B 2215/04; B23B 2220/04; B23B 2220/08; B23C 3/007; B23C 3/12; B23C 3/122; B23C 3/124; B23D 79/02; Y10T 29/4932; Y10T 29/5168; Y10T 82/2511; Y10T 409/501476; Y10T 409/50164; Y10T 409/501804; Y10T 29/5109; Y10T 29/5114; Y10T 409/50246; B24B 9/007
USPC ................. 29/27 C, 27 R, 50, 889.2; 82/122; 409/297, 298, 299, 303
See application file for complete search history.

(56) References Cited

U.S. PATENT DOCUMENTS 5,897,273 A 4/1999 Leite
6,217,262 B1 4/2001 Wright
(Continued)

FOREIGN PATENT DOCUMENTS

DE 473 181 3/1929
EP 0 818 264 1/1998
(Continued)

OTHER PUBLICATIONS

International Search Report Issued May 10, 2012 in PCT/FR11/52530 Filed Oct. 28, 2011.

*Primary Examiner* — Sunil K Singh
*Assistant Examiner* — Michael Vitale
(74) *Attorney, Agent, or Firm* — Oblon, McClelland, Maier & Neustadt, L.L.P.

(57) ABSTRACT

A method for machining a casing of an aircraft turboshaft engine, the casing including an upstream edge and a downstream edge. The method includes: positioning the casing in a chassis; rotating the chassis at a rotational milling speed; milling a downstream edge and/or upstream edge of the casing by a milling device, so as to correct axial length of the casing; and deburring the casing edge so as to remove at least one burr formed in a vicinity of the edge as a result of the milling, the milling device including a scraper tool which turn-machines the burr as the casing is rotated.

11 Claims, 5 Drawing Sheets

(51) Int. Cl.
    *B23B 31/08*     (2006.01)
    *B23D 79/02*     (2006.01)
    *B23C 3/12*     (2006.01)
    *B24B 9/00*     (2006.01)
    *B24B 9/04*     (2006.01)

(52) U.S. Cl.
    CPC ................ *B23D 79/02* (2013.01); *B24B 9/007* (2013.01); *B24B 9/04* (2013.01); *B23B 2215/04* (2013.01); *B23B 2220/08* (2013.01); *Y10T 29/4932* (2015.01); *Y10T 29/49323* (2015.01); *Y10T 409/30868* (2015.01); *Y10T 409/303752* (2015.01); *Y10T 409/304256* (2015.01); *Y10T 409/50164* (2015.01); *Y10T 409/50246* (2015.01)

(56) References Cited

U.S. PATENT DOCUMENTS

| | | | | |
|---|---|---|---|---|
| 7,134,173 | B2 * | 11/2006 | Gstir et al. | 29/27 C |
| 7,500,297 | B2 * | 3/2009 | Okada et al. | 29/27 C |
| 7,565,796 | B2 * | 7/2009 | Eleftheriou et al. | 60/226.1 |
| 7,707,705 | B2 | 5/2010 | Pleugel et al. | |
| 2008/0086880 | A1 * | 4/2008 | Barnett et al. | 29/889.2 |

FOREIGN PATENT DOCUMENTS

| | | |
|---|---|---|
| EP | 0 849 021 | 6/1998 |
| FR | 2 702 981 | 9/1994 |
| JP | 63123603 A * | 5/1988 |
| WO | 2006 119548 | 11/2006 |

* cited by examiner

METHOD FOR MACHINING A CASING OF AN AIRCRAFT TURBOSHAFT ENGINE AND SCRAPER TOOL FOR IMPLEMENTING SAID METHOD

The field of the invention is for machining a metal part and more specifically for machining a material excess on the edge of a metal part, such machining being known from the man skilled in the art as deburring.

As an example, an exhaust casing in an aircraft turboshaft engine is a cylindrical metal part with a substantially circular section. The exhaust casing is arranged so as to extend along the engine axis, outside the air flow circulating from upstream to downstream in the engine. Further on, the terms "upstream" and "downstream" are defined with respect to the airflow circulation direction inside the engine. Thus, as being partly represented in the sectional view of FIG. 1, the outside ferrule of the exhaust casing presents a cylindrical body axially extending along the axis W and comprising an upstream edge BM and a downstream edge BV.

Also, conventionally in the present application, the words "inside" and "outside" are radially defined with respect to the axis W of the casing shown on FIG. 1. Thus, a cylinder extending along the axis of the engine comprises an inside surface turned towards the engine axis and an outside surface being opposed to the inside surface thereof. Consequently, the upstream edge BM comprises an outside portion BM1 and an inside portion BM2. In the same way, the downstream edge BV comprises an outside portion BV1 and an inside portion BV2.

Conventionally, the exhaust casing is obtained by welding angular sectors of the casing. After assembling the sectors, the exhaust casing being obtained does not possess a regular circular section, the radius of curvature of the casing edges being not constant. The exhaust casing must manually be reshaped by applying mechanical efforts on the outside surface of the casing so as to give it a substantially circular shape.

In order to allow circular flanges to be mounted on the upstream and downstream edges of the casing, it is required that the casing possesses a constant axial length. In a known way, the axial length of the casing is corrected by means of a milling device. In practice, the exhaust casing is put in a lying position as shown on FIG. 2 so that one of the upstream or downstream edges of the casing extends horizontally along the direction X.

During the milling operation, the upstream and/or downstream edge(s) is or are machined so as to correct the axial length of the casing, i.e. the vertical size thereof along the direction Z when the exhaust casing is in a lying position. Such operation is also called "height setting" of the exhaust casing by the man skilled in the art.

Machining the edges of the casing leads to a machined material deposit in the vicinity of the upstream and downstream edges as well as on the inside and outside surfaces, such material deposit being known from the man skilled in the art as a burr. The burrs form sharp edges that may hurt an operator upon the manipulation of the exhaust casing and should thus be eliminated through a deburring method.

Such deburring method is presently implemented by hand through operators using various tools, such as a manual pneumatic sanding machine equipped with an abrasive band known for example under the trade name "Rayonmatic", a hand scraper or a pneumatic grinding machine provided with a milling cutter. As regards safety, the use of such tools leads, on the one side, to the projection of harmful dusts and, on the other side, to an injury risk for the operators. The operator is then obliged to wear a mask, gloves and goggles, thereby extending the manipulation times. The deburring step is a long step (of about 15 minutes), the final result varies depending on the skill of the operators, which presents a disadvantage.

Furthermore, it is known through the patent FR 2 620 242 of the SNECMA company relative to a method for using a deburring robot. Such a method is not adapted, because it requires a specialized deburring robot, thereby increasing the deburring cost. Moreover, there is a risk of an injury for the operator upon the installation of the exhaust casing in the deburring robot.

In order to eliminate at least some of such disadvantages, the invention relates to a method for machining an aircraft turboshaft engine casing, the casing extending along a casing axis and comprising an upstream edge and a downstream edge, the method comprising the following steps:

one step for positioning the casing in a chassis;

one chassis rotating step according to the casing axis at a milling rotation speed;

one milling step for the downstream edge and/or the upstream edge of the casing by means of a milling device so as to correct the axial length of the casing, the milling device comprising a milling tool machining said casing edge upon the rotation of the casing at the milling rotation speed;

one deburring step for said casing edge so as to remove at least one burr formed in the vicinity of said edge further to the milling step, a method wherein, the milling device comprising a scraper tool upon the deburring step, the scraper tool machines the burr by turning upon the casing rotation at the milling rotation speed.

Thanks to the method according to the invention, the deburring step is directly implemented further to the milling step by means of a same milling device, thereby extending the duration for the machining method.

Moreover, the milling rotation speed of the casing is advantageously used for turning with no chassis modification. Since the deburring and milling steps are consecutive, it is not necessary to manipulate the casing, thereby limiting the risk at an injury. As the deburring is automated, the injury risk is very weak and the final result does not depend on the skill of the operator.

Preferably, the casing comprising an inside portion turned to the casing axis and an outside portion being opposed to said inside portion, the inside portion and the outside portion of said casing edge are successively machined upon the deburring step while holding the casing positioned within the chassis.

Once the inside and outside portions of an edge being deburred, it is possible to arrange on said edge a fastening flange with no injury risk. Moreover, no manipulation of the casing is required to reach the inside and outside burrs, the scraper tool being adapted to reach the inside burr as well as the outside burr.

Still preferably, upon the deburring step, the upstream and downstream edges of the casing are machined while holding the casing positioned within the chassis. No manipulation of the casing is necessary to reach the burrs of the upstream and downstream edges, thereby limiting the injury risk, the milling device moving the scraper tool so as to reach the different edges.

The invention also relates to a scraper tool so as to deburr an edge of an aircraft turboshaft engine casing, the scraper tool being arranged to be mounted in a milling device, the tool comprising a body including, on a first end, connection means for the milling device and, on a second end, a deburring module comprising a turning lathe platelet including at least one cutting edge arranged so as to deburr the casing edge.

The scraper tool advantageously enables to replace a conventional milling tool of the milling device to implement a deburring, the turning lathe platelet being adapted for implementing the turning operation.

According to one aspect of the invention, the deburring module comprises guiding means provided to come in contact with the edge to be deburred so as to follow the profile of the edge to be deburred without modifying the orientation of the turning lathe platelet. The guiding means follow the profile of the casing edge so as to position the turning lathe platelet at the level of the edge burr. The orientation of the turning lathe platelet is not advantageously modified so as to make a precise deburring of the burr possible.

Still preferably, the deburring module comprises a connection pole, on which the turning lathe platelet is mounted, and a plate being rotationally mounted around said connecting pole, the guiding means being arranged on said plate. Thus, when the guiding means come in contact with the edge to be deburred, the plate is driven into rotation around the connecting pole without modifying the orientation of the turning lathe platelet. In other words, the guiding means modify the cutting height of the burr without modifying the cutting angle.

Preferably, the guiding means comprise at least two parallel rolls provided to come simultaneously in contact with the edge to be deburred. The use of two rolls allows, on the one side, to obtain a stable abutment on the edge without modifying the orientation of the turning lathe platelet and, on the other side, to enable the casing rotation upon deburring. In fact, one roll comprises by nature an inside core and an outside sheath rotationally mounted on said inside core. Upon the casing rotation, only the outside sheath of the roll is driven into rotation, thereby avoiding the driving of the inside core as well as the one of the deburring module plate, which is integrally arranged with the inside core.

Preferably, the connecting pole extends between the rolls. The cutting height is perfectly defined between the two rolls, the turning lathe platelet can thus machine the edge burr on a precise way. More preferably, the connecting pole is mounted at the same distance from the rolls, thereby improving the deburring precision still more.

According to another aspect of the invention, one end of the connecting pole is mounted within the tool body, spring means being arranged between said end of the connecting pole and said body so as to calibrate the cutting effort of the turning lathe platelet on the edge to be deburred.

The spring means enable to calibrate the effort of the turning lathe platelet and thus the penetration of the turning lathe platelet on the casing edge so as to withdraw the burr optimally, without machining excessively or insufficiently. That allows furthermore an edge to be deburred, the curvature radius of which varies and is not regular. This is very advantageous for a casing formed from sectors.

According to a first aspect, the spring means comprise at least one damping rod mounted within the tool body. Preferably, the damping rod comprises adjusting means for damping the damping rod so as to calibrate the cutting effort.

According to a second aspect, the spring means comprise at least one spring mounted around the connecting pole.

According to a preferred aspect of the invention, the casing comprising an inside portion and an outside portion, the turning lathe platelet comprises at least two parallel cutting edges being arranged to deburr respectively an inside portion and an outside portion of the casing edge. The shape of the turning lathe platelet is adapted so as to machine both portions, thereby enabling a successive machining of said portions upon deburring and thus provides a time gain.

The invention will be better understood with the help of the following description of the invention referring to the accompanying drawings, wherein.

The invention will be presented now as an example for an exhaust casing of an aircraft turboshaft engine, but it goes without saying that the invention applies to any exhaust casing, preferably a circumferential casing built by making several casing sectors integral.

Figure 1:
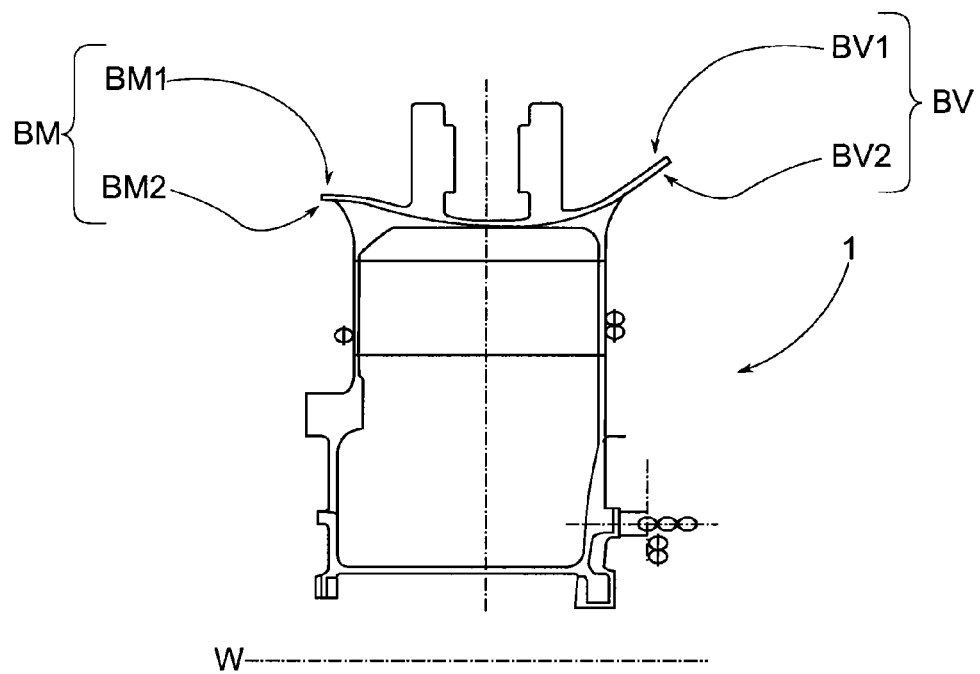
FIG. 1 is a part sectional view of an outside ferrule of an aircraft turboshaft engine exhaust casing extending along an axis W (already commented)
Figure 2:
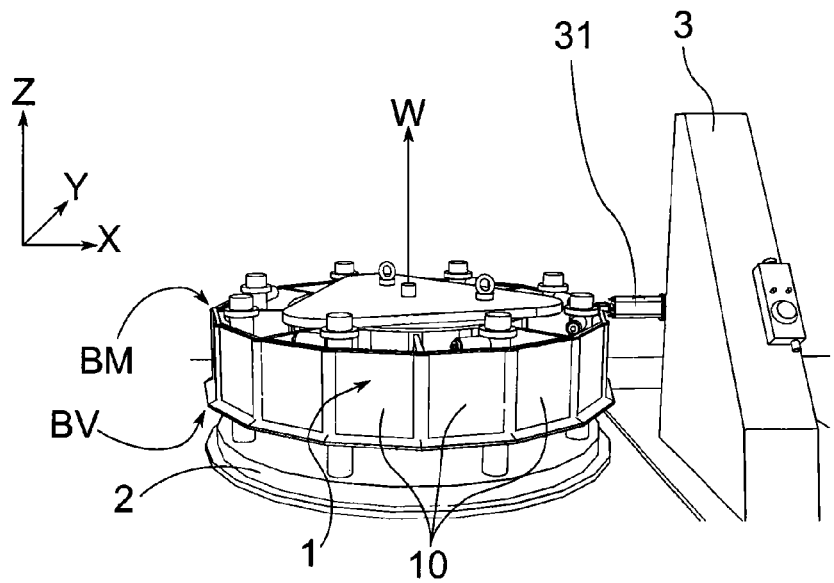
FIG. 2 is perspective view of an exhaust casing and a milling device according to the state of the art upon a milling operation for the axial length of the exhaust casing (already commented)

As shown on FIGS. 1 and 2, an exhaust casing 1 of an aircraft turboshaft engine is a metal part with a cylindrical shape axially extending alon an axis W and comprising an upstream edge BM and a downstream edge BV. In such example, the exhaust casing 1 is circumferential and is built by making several casing sectors 10 integral. It results therefrom, on one side, that the axial dimension of the exhaust casing 1, i.e. the size along the axis W, is not constant at the casing circumference and, on the other side, that the profile of the edges of the exhaust casing 1 is not regular.

In order to correct the axial dimension of the casing 1, a machining step is carried out on one of the upstream and/or downstream edges so that the distance from the upstream edge to the downstream edge is substantially constant for the circumference of the casing 1. According to the invention, referring to FIG. 2, the axial length of the casing 1 is corrected through a milling device 3 comprising a milling tool 31 for coming in contact with the upstream BM and/or downstream BV edges of the exhaust casing 1. Further on, the exhaust casing 1 and the milling device 3 are shown on FIG. 2 in an orthogonal referential system (X, Y, Z).

Upon milling, the exhaust casing 1 is put in a lying position within a chassis 2, also called machining center, so that the axis W thereof vertically extends along the vertical direction Z. The chassis 2 is here arranged around the axis W thereof so as to present the whole circumference of the edges BM, BV of the exhaust casing 1 before the milling tool 31 of the milling device 1. The rotation speed of the exhaust casing 1 is weak of the order of 1 cm/sec so as to renew the portion of the edge to be deburred by the milling tool without generating horizontal efforts therefor. Such speed is known from the man skilled in the art by the expression "milling rotation speed". The milling tool 31 comprises here a milling cutter being driven at a high speed of about 30 m/min; such milling tool is known from the man skilled in the art.

In such example, the upstream edge BM and the downstream edge BV are both machined, thereby leading to a machined material deposit in the vicinity of the upstream BM and downstream BV edges, as well on the inside surface and the outside surface of the exhaust casing 1, such material deposit being known from the man skilled in the art under the meaning "burr". In order to eliminate such burrs, it is necessary to machine the outside BM1 and inside BM2 portions of the upstream edge BM as well as the outside BV1 portions and inside BV 2 portions of the downstream edge BV. For sake of simplicity, "the burrs" will designate further on the inside upstream burr BM2, the outside upstream burr BM 1, the inside downstream burr BV2 and the outside downstream burr BV 1.

According to the invention, the burrs will be eliminated with the help of a scraper tool 4 mounted on the milling device 3, thereby machining the burrs by turning (and not by milling).

Upon a milling operation, the material removal results from the combination of two movements: the rotation of the cutting tool, on the one side, and the advance of the part to be machined on the other side. On the contrary, upon a turning operation, the cutting movement consists in one single movement: either the part to be machined is stationary and the cutting tool is mobile, or the part to be machined is mobile and the cutting tool is stationary.

Scraper Tool 4

The scraper tool 4 will be first of all presented. The use thereof in the machining method according to the invention will be detailed later on.

Figure 3:
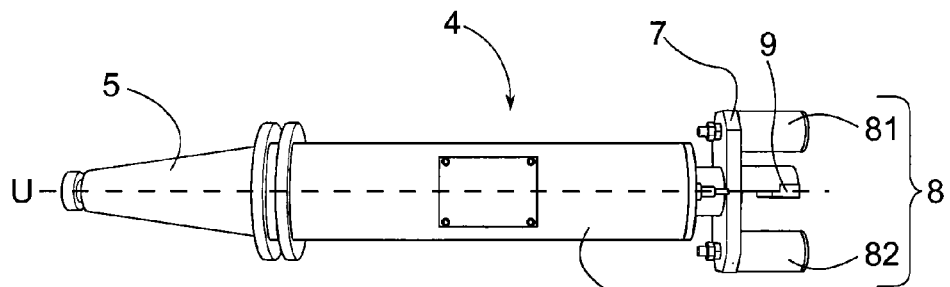
FIG. 3 is a perspective view of a scraper tool according to a first embodiment of the invention so as to deburr an edge of the exhaust casing.

Referring to FIG. 3, the scraper tool 4 comprises a body 6 longitudinally extending along the direction U, that includes, on a first end, means 5 for connection with a milling device 3 and, on a second end, a deburring module 7 being arranged to machine the burrs.

Connecting Means 5

The connecting means 5 are present in such example under the shape of a tapered connection (known from the man skilled in the art under the designation "taper S40") adapted to be connected with the milling device 3 like a conventional milling tool. In other words, the scraper tool 4 according to the invention is adapted to be connected with the milling device 3 instead of the milling tool 31. Such connections means 5 are traditionally adapted to enable the transmission of a milling speed set point from the milling device 3 to the milling tool so that the milling cutter of the milling tool is driven at such milling speed. As for an example, if the milling speed set point is of 5000 revolutions/min for the milling device 3, such set point is transmitted by the tapered connection of the milling tool so that the milling cutter thereof rotates at 5000 revolutions/min.

According to the invention, the connecting means 5 are arranged to impose a nil milling speed, since the scraper tool 4 is not a milling tool, but a turning tool that, by nature, implements a machining step while staying stationary. Thus, differently from the traditional connecting means, the connecting means 5 according to the invention inhibit the milling set points from the milling tool 3.

Deburring Module 7

In this example, in reference to FIGS. 3 to 6, the deburring module 7 comprises a connecting pole 72 extending along the direction U, on which a plane plate 71 is rotationally mounted, here with a polygonal shape, extending perpendicularly to the direction U.

A turning lathe platelet is mounted on a first end of the connection pole 72. The platelet 9 comprises four cutting edges C1-C4 arranged to deburr the inside upstream burr BM2, the outside upstream burr BM1, the inside downstream burr BV2 and the outside downstream burr BV1. As shown schematically on FIG. 6, the turning lathe platelet shows a diamond shape, the edges C1 and C3 as well as the edges C2 and C4 are parallel between them. In the mounted position, the cutting edges C1-C4 partially project from the connection pole 72 as shown on FIG. 4. The turning lathe platelet is here made of aluminum, but it goes without saying that other materials could also be appropriate.

Figure 5:
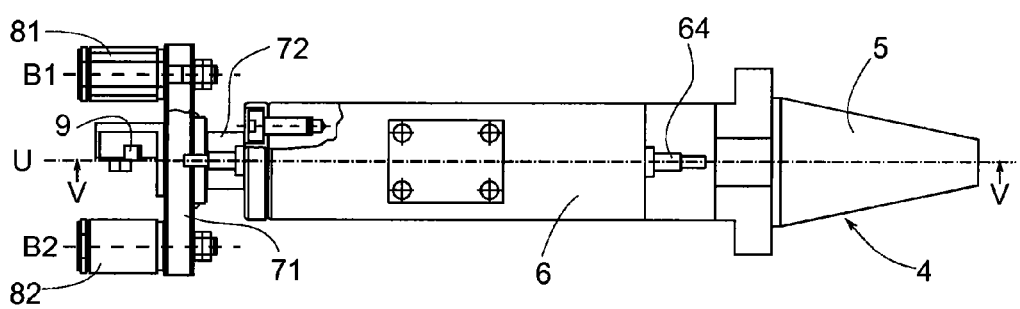
FIG. 5 is a schematic view of the scraper tool of FIG. 3, a sectional plan V-V being shown.
Figure 6:
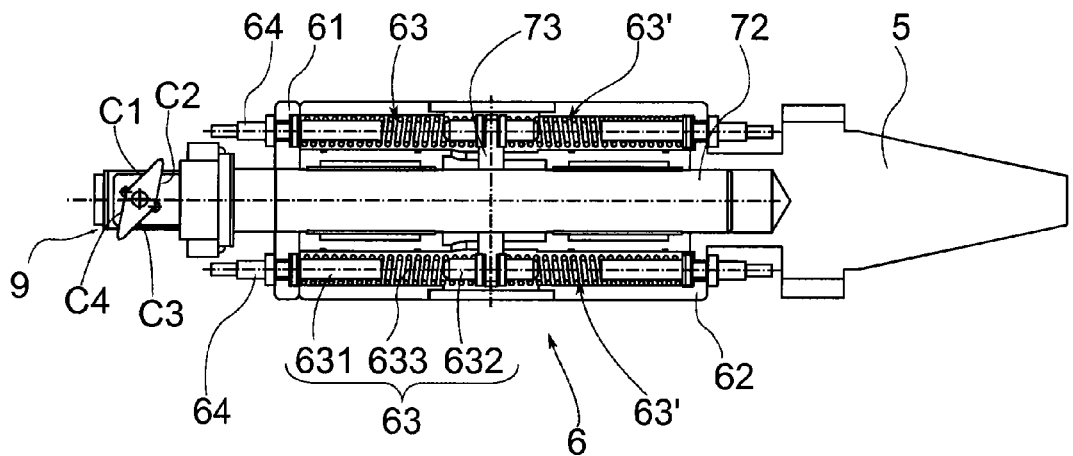
FIG. 6 is a schematic sectional view according to the section plan V-V of the scraper tool of FIG. 5.

As represented on FIGS. 5 and 6, a second end of the connecting pole 72 extends within the longitudinal body 6 of the scraper tool 4. The longitudinal body 6 comprises limiting means for the stroke of the connecting pole 72 along the direction U having in such example the shape of a front abutment 61 and a rear abutment 62 being integral with the body 6.

Moreover, to apply a calibrated effort on the edge to be deburred, spring means are arranged around the second end of the connecting pole 72 as shown on FIG. 6. The spring means are positioned on either side of a stop ring 73 being integral with the second end of the connection pole 72.

According to a first embodiment of the invention, four damping rods 63, 63' are mounted in the body 6, two first damping rods 63 being mounted on one portion of the stop ring 73, two second damping rods 63' being mounted on another portion of said stop ring 73 as shown on FIG. 6. Each first damping rod 63 is here positioned so as to be in a longitudinal alignment with a second damping rod 63' so as to apply the effort distributed on the stop ring 73.

A damping rod 63, 63' extends longitudinally and comprises a first rectilinear member 631 and a second rectilinear member 632 being connected by a spring 633. In such example, the spring 633 is mounted outside the rectilinear members 632, 633 so as to enable the longitudinal guiding thereof. As shown on FIG. 6, the second rectilinear member 632 is mounted in a abutment on a face of the stop ring 73, whereas the first end 631 is integrally mounted with one of the abutments 61, 62. Preferably, each damping rod 63 comprises adjustment means 64 being arranged to parameterize the constraint of the spring 633 of the damping rod 63. As shown on FIGS. 4 to 6, such adjustment means 64 as formed by one end of the first member 631 of the damping rod 63 projecting from the body 6 of the tool. Quite advantageously, by screwing or unscrewing the projecting end, the axial length of the first member 631 of the damping rod 63 is controlled in the body 6 and the compression length of the spring 633 of the damping rod 63 is then parameterized, thereby modifying the constraint being applied. Thus, for the four damping rods 63, 63', four adjusting means 64 of an easy access and handle are available so as to parameterize with precision the force of the springs 633 on the connecting pole 72 and thus, the cutting force of the tool 4.

As for an example, when the turning lathe platelet 9 is abutted on an inside edge of the exhaust casing 1, the spring means enable to calibrate the bearing force for deburring. In order to push the turning lathe platelet 9 on the inside edge, an effort is exerted on the scraper tool 4 towards the outside of the exhaust casing 1. In other words, the body 6 is driven outside, whereas the connecting pole 72 (being integral with the turning lathe platelet 9) is stationary due to the contact with the edge of the casing 1. It results therefrom a relative movement of the connecting pole 72 with respect to the body 6, thereby increasing the length of the portion of the connecting pole 72 projecting outside the body 6. In this example, the first damping rods 63 limit the movement of the connecting pole 72 by applying an opposite force on the stop ring 73 so as to limit the length of the portion of the connecting pole 72 projecting outside the body 6.

In other words, the first damping rods 63 fulfill a damping function in order to balance the effort applied to the connecting pole 72 and thus the effort applied by the turning lathe platelet 9 on the inside edge. The cutting edge of the turning lathe platelet 9 contacting the edge can thus remove the burr optimally, i.e. without machining said edge in an excessive or insufficient way. An excess machining presents this advantage to exceed the machining tolerance range, thereby requiring an alteration by welding, an insufficient machining having this advantage that a reduced burr remains, but that can still cause injuries for the operators. In the set of the damping rods 63, 63', two damping rods are used for machining while pushing and two other are used for machining while drawing. The springs of the damping rods are selected with respect to the hardness of the material to be machined.

Furthermore, this allows an edge to be deburred, the curvature radius of which varies and is not regular. This is most advantageous for a casing formed from sectors. In this example, the damping rods 63, 63' and the abutments 61, 62 enable a stroke of the connecting pole 72 of about 10 mm so as to overcome the circularity variations of about 1.5 mm for an average exhaust casing.

Figure 11:
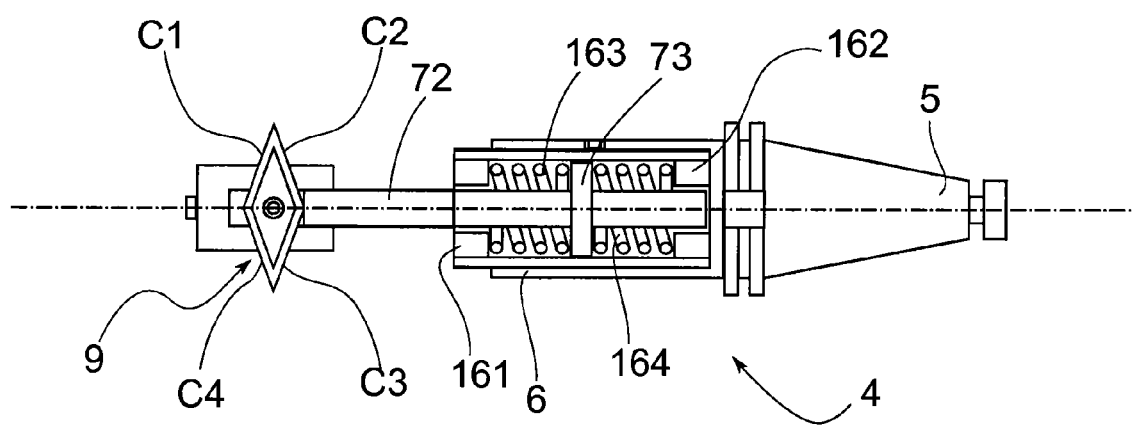
FIG. 11 is a schematic section of a scraper tool according to a second embodiment.

According to another embodiment of the stroke limitation means for the connecting pole 72 along the direction U, in reference to FIG. 11, the spring means take the shape of a first spring 163 and a second sprint 164 mounted on either side of the stop ring 73 being integral with the second end of the connecting pole 72. Referring to FIG. 11, the first spring 163 is mounted around the connecting pole 72 in the body 6 between a front abutment 161 and the stop ring 73, a second spring 164 being mounted around the connecting pole 72 in the body 6 between the stop ring 73 and a rear abutment 162. Such means are simple to be implemented and manufactured. In order to calibrate the cutting force, it is advantageously possible to control the position of the abutments 161, 162 and thus to modify the constraint of the springs 163, 164.

Guiding Means 8

In order to position the turning lathe platelet 9 at the height of the burr, the deburring module 7 further comprises guiding means 8 arranged to follow the profile of the edge portion to be deburred by guiding the deburring module 7.

Referring to FIGS. 3 to 6, the guiding means 8 take in this example the shape of two rotating cylindrical rolls 81, 82 extending from the plate 71 and the orientation axes B1, B2 extend perpendicularly to the plan defined by said plate 71. In other words, the axes B1, B2 of the rotating rolls 81, 82 are parallel between them and extend along the axis U. Each roll 81, 82 comprises here an inside core being integral with the plate 71 and an outside sheath rotationally mounted on said inside core.

Figure 4:
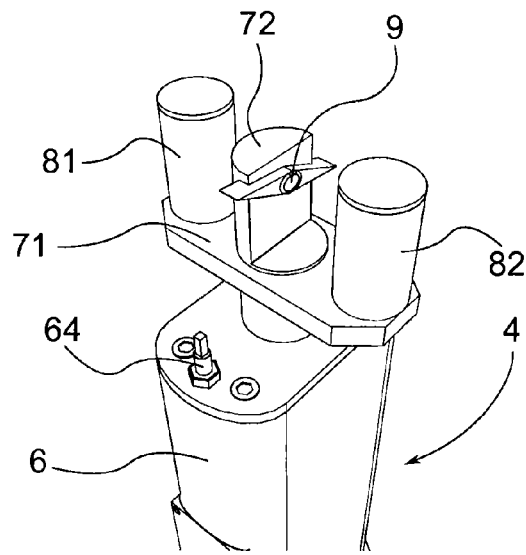
FIG. 4 is an end view of the scraper tool of FIG. 3.

As shown on FIG. 4, the connecting pole 72 extends between the two rolls 81, 82, in this example, at the same distance from the rolls 81, 82. When the rolls 81, 82 abut on a transverse portion of the edge of the exhaust casing 1, i.e. in a vertical abutment along the direction Z, the deburring height is defined with precision to position the turning lathe platelet 9 being integral with the connecting pole 72. The turning lathe platelet 9 is at the good cutting height to machine the burr located between the two rolls 81, 82, i.e. the edge portion being deburred.

As and when the exhaust casing 1 rotates around the axis W thereof, the profile of the curvilinear edge portion located between the two rolls 81, 82 varies. Only the outside sheath of the rolls 81, 82 is driven into rotation, thereby avoiding the driving of the inside core of the rolls 81, 82 as well as the plate 71 of the deburring module 7. It results therefrom a movement of the plate 71 that leads to a vertical movement of the connecting pole 72 without modifying the orientation of the turning lathe platelet 9.

Figure 8:
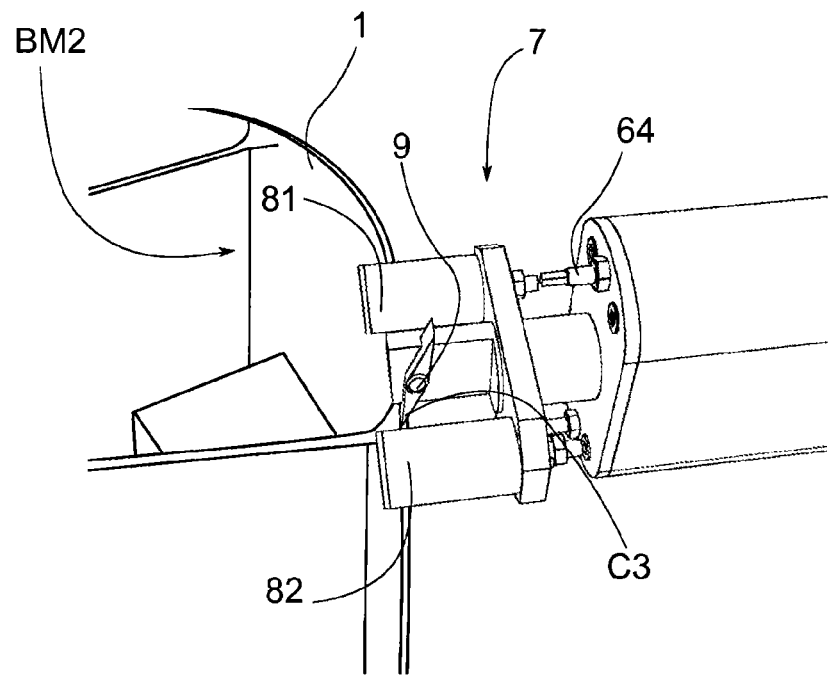
FIG. 8 is a perspective view of the deburring step for the inside upstream edge of the exhaust casing.
Figure 9:
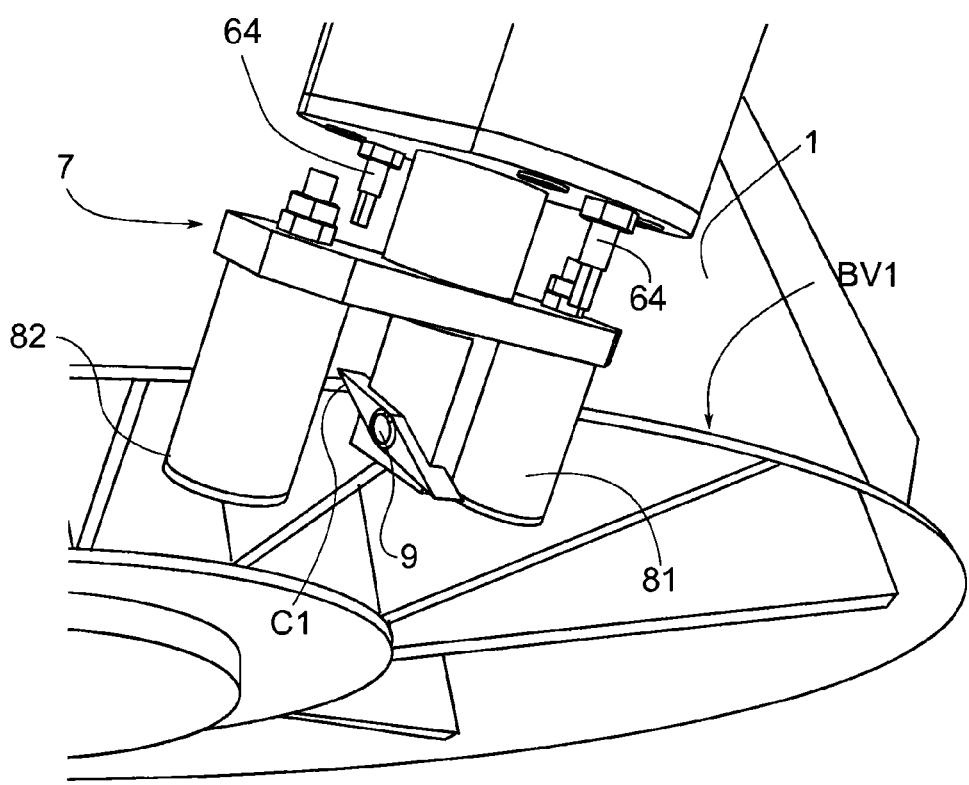
FIG. 9 is a perspective view of the deburring step for the outside downstream edge of the exhaust casing.
Figure 10:
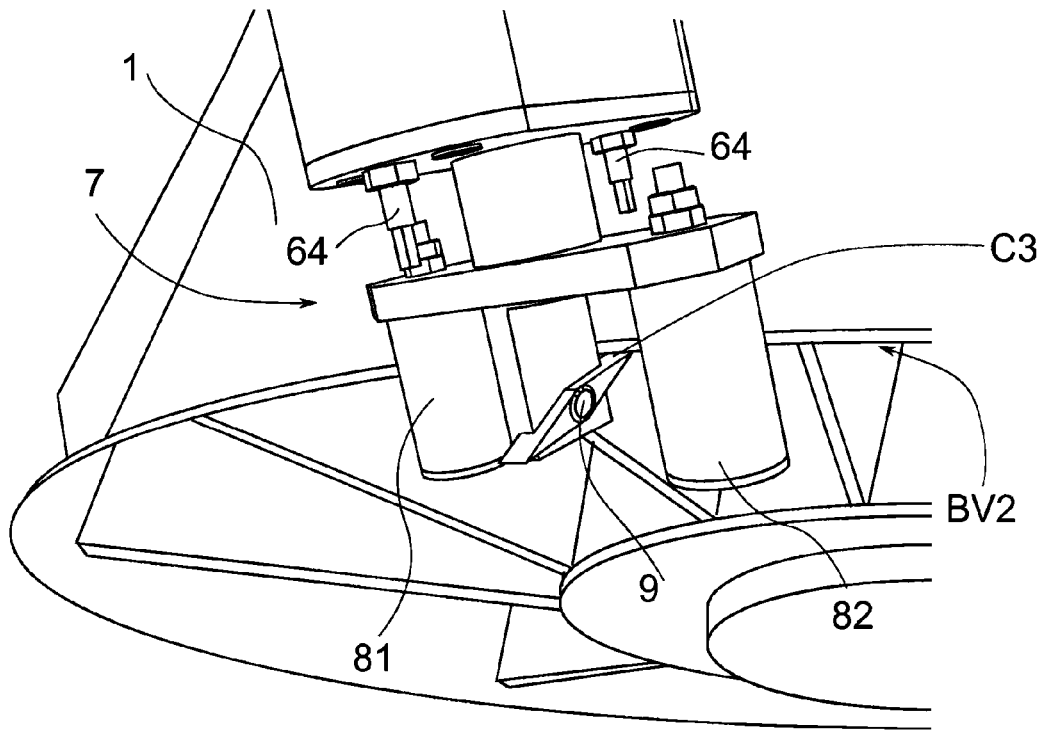
FIG. 10 is a perspective view of the inside downstream edge of the exhaust casing.

The invention will be now presented, in reference to FIGS. 7 to 10, during the deburring operation for the outside upstream burr BM1 (FIG. 7), the inside upstream burr BM2 (FIG. 8) the outside downstream burr BV1 (FIG. 9) and the inside downstream burr BV2 (FIG. 10).

Implementation of the Machining

According to the invention, after height setting of the exhaust casing 1 at the right height, while the latter is still in a lying position in the chassis 2, the deburring operation is started by substituting to the milling tool 31 of the milling device 3 the above mentioned scraper tool 4.

The scraper tool 4, which is not a milling tool, does not include any rotating portion for machining, but only a turning lathe platelet 9. In a very advantageous way, the rotation of the chassis 2 is not modified between the milling operation and the deburring operation, thereby advantageously enabling to machine the exhaust casing 1 by turning, the casing 1 being driven into rotation around the axis W at the milling rotation speed, while the scraper tool 4 stays stationary.

Figure 7:
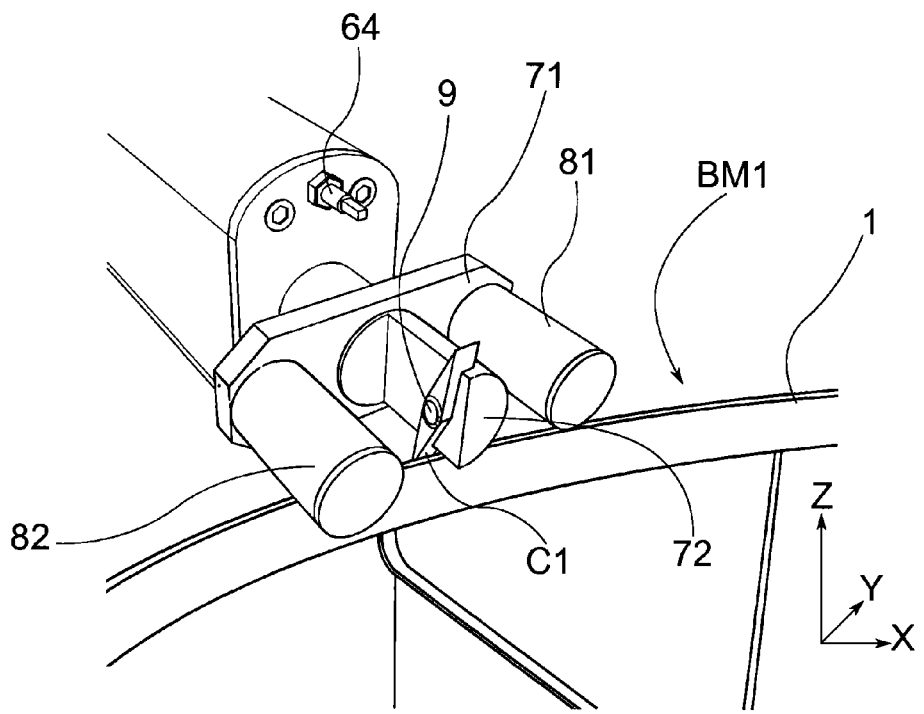
FIG. 7 is a perspective view of the deburring step for the outside upstream edge of the exhaust casing.

As for an example, referring to FIG. 7, the milling device 3 positions the scraper tool 4 on the upstream edge BM in order to machine the outside burr BM1 of the exhaust casing 1. To do so, the cutting edged C1 of the scraper tool 4 is positioned, at least partially, outside the exhaust casing 1 and is abutted on the outside portion of the upstream edge BM1, the springs 63, 64 calibrating the bearing force of the cutting edge C1. Referring to FIG. 7, the turning lathe platelet 9 extends obliquely with respect to the vertical direction Z and is directed inside the exhaust casing 1 upwards.

The rolls 81, 82 are in a vertical abutment along the axis Z on the upstream edge BM so as to follow the profile of said edge BM1 upon the rotation of the exhaust casing 1. As the profile evolves, the height of the rolls 81, 82 along the direction Z is modified, thereby modifying the cutting height of the cutting edge C1.

The upstream outside burr is literally scraped by the cutting edge C1 during the rotation of the exhaust casing 1, which corresponds to a machining by turning. The outside upstream edge BM1 is smooth after deburring, thereby making the manipulation of the exhaust casing 1 easier.

In order to deburr the inside upstream edge BM2 as shown on FIG. 8, the deburring module 7 is rotated within a half revolution around the axis U so that the cutting edge C3 is in contact with the inside upstream edge BM2. Referring to FIG. 8, the turning lathe platelet 9 extends obliquely with respect to the vertical direction Z and is directed outside the exhaust casing 1 upwards.

On a way being similar to the deburring of the outside upstream edge BM1, the deburring by the cutting edge C3 enables to make the inside upstream edge BM2 smooth, thereby making the manipulation of the exhaust casing 1 easier. Moreover, as the inside and outside burrs of a same edge have been removed, it is easy to mount a flange on said edge.

As regards the downstream edge BV, the milling device 3 enables to tilt the scraper tool 4 downwards so as to reach the inside and outside portions of the downstream edge BV as represented on FIGS. 9 and 10, the cutting edges C1, C3 machining respectively the outside downstream edge BV1 and the inside downstream edge BV2.

Once the four burrs being removed, the exhaust casing 1 is removed from the chassis 2 so as to mount for example flanges on said edges.

Thanks to the machining method according to the invention, it is possible to carry out the height setting and deburring operations by means of a same milling device while only changing the machining tool. Moreover, such operations do not require to remove the exhaust casing 1 from the chassis 2, thereby allowing to connect said operations and thus to shorten the overall duration of the machining method for the exhaust casing 1. Furthermore, the injury risk for an operator is eliminated due to the fact that all the operations are carried out by the milling device with no manipulation of the exhaust casing 1 by an operator.

The invention claimed is:

1. A method for machining a casing of an aircraft turboshaft engine, the casing extending along a casing axis and including an upstream edge and a downstream edge with respect to an airflow circulation direction inside the aircraft turboshaft engine, the method comprising:
    positioning the casing in a chassis;
    rotating the casing about the casing axis at a milling rotation speed;
    milling the downstream edge and/or the upstream edge of the casing with a milling tool of a milling device so as to correct an axial length of the casing along the casing axis by machining the downstream edge and/or upstream edge with the milling tool while rotating the casing at the milling rotation speed; and
    deburring the downstream edge and/or the upstream edge so as to remove at least one burr formed on the downstream edge and/or the upstream edge after the milling, wherein
    the deburring includes using a scraper tool of the milling device in the deburring and machining the at least one burr with the scraper tool while rotating the casing at the milling rotation speed.

2. The method according to claim 1, wherein the casing includes an inside portion of the downstream edge and/or the upstream edge that faces the casing axis and an outside portion of the downstream edge and/or the upstream edge opposed to the inside portion, the inside portion of the downstream edge and/or the upstream edge and the outside portion of the downstream edge and/or the upstream edge are successively machined during the deburring while holding the casing positioned within the chassis.

3. The method according to claim 2, wherein, during the deburring, the upstream and downstream edges of the casing are machined while holding the casing positioned within the chassis.

4. The method according to claim 1, wherein the rotating includes rotating the chassis, with the casing positioned in the chassis, so that a rotation of the chassis is not modified between the milling and the deburring.

5. The method according to claim 1, wherein the milling includes correcting the axial length of the casing, which is a casing formed of a plurality of angular sectors that are joined together.

6. The method according to claim 1, wherein the milling and the deburring are performed consecutively.

7. The method according to claim 1, wherein the deburring includes machining the at least one burr with the scraper tool while the scraper tool is stationary.

8. The method according to claim 1, wherein the deburring includes machining the at least one burr with the scraper tool, which is a scraper tool that includes at least two parallel cutting edges.

9. The method according to claim 1, wherein the casing includes an inside portion of the downstream edge and/or the upstream edge that faces the casing axis and an outside portion of the downstream edge and/or the upstream edge opposed to the inside portion, and the deburring includes rotating the scraper tool within a half revolution around an axis of the scraper tool to switch between machining one of the inside portion and the outside portion and machining the other one of the inside portion and the outside portion.

10. The method according to claim 1, wherein the deburring includes guiding the scraper tool with rollers that abut a portion of the downstream edge and/or the upstream edge.

11. The method according to claim 10, wherein the guiding includes driving an outside sheath of the rollers in rotation.

* * * * *